United States Patent
Ding et al.

(10) Patent No.: US 7,253,582 B1
(45) Date of Patent: Aug. 7, 2007

(54) DISK DRIVE ESTIMATING ANGULAR POSITION OF SPINDLE MOTOR DURING SPIN-UP BY COMPUTING DIFFERENCES IN WINDING CURRENT RISE TIMES

(75) Inventors: Jianghong Ding, Lake Forest, CA (US); Chuanwen Ji, Irvine, CA (US); David D. Nguyen, Fountain Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 634 days.

(21) Appl. No.: 10/856,320

(22) Filed: May 28, 2004

(51) Int. Cl.
*G05B 1/06* (2006.01)

(52) U.S. Cl. .................. 318/652; 318/273; 318/259; 360/73.03; 360/74.1

(58) Field of Classification Search ............... None
See application file for complete search history.

(56) References Cited

U.S. PATENT DOCUMENTS

| | | | |
|---|---|---|---|
| 5,122,998 A | 6/1992 | Mizuno et al. | |
| 5,530,326 A | 6/1996 | Galvin et al. | |
| 5,569,990 A | 10/1996 | Dunfield | |
| 6,100,656 A | 8/2000 | El-Sadi et al. | |
| 6,104,153 A | 8/2000 | Codilian et al. | |
| 6,198,590 B1 | 3/2001 | Codilian et al. | |
| 6,369,541 B1 | 4/2002 | Albert | |
| 6,549,359 B1 | 4/2003 | Bennett et al. | |
| 6,549,361 B1 | 4/2003 | Bennett et al. | |
| 6,574,062 B1 | 6/2003 | Bennett et al. | |
| 6,577,465 B1 | 6/2003 | Bennett et al. | |
| 7,158,329 B1 * | 1/2007 | Ryan | 360/73.03 |
| 2002/0171380 A1 | 11/2002 | Heydt et al. | |

* cited by examiner

*Primary Examiner*—Lincoln Donovan
*Assistant Examiner*—Erick Glass
(74) *Attorney, Agent, or Firm*—Howard H. Sheerin, Esq.

(57) ABSTRACT

A disk drive is disclosed comprising a spindle motor having a plurality of windings including at least a first winding, a second winding, and a third winding. During a spin-up operation, a voltage is applied to the first winding and a first rise time is measured for current flowing through the first winding to reach a predetermined threshold. A voltage is applied to the second winding and a second rise time is measured for current flowing through the second winding to reach a predetermined threshold. A voltage is applied to the third winding and a third rise time is measured for current flowing through the third winding to reach a predetermined threshold. A difference is computed in response to the first rise time, the second rise time, and the third rise time, and an angular position of the spindle motor is estimated by computing an arctangent in response to the difference.

18 Claims, 8 Drawing Sheets

FIG. 8

DISK DRIVE ESTIMATING ANGULAR POSITION OF SPINDLE MOTOR DURING SPIN-UP BY COMPUTING DIFFERENCES IN WINDING CURRENT RISE TIMES

BACKGROUND OF THE INVENTION

1. Field of the Invention

The present invention relates to disk drives. More particularly, the present invention relates to a disk drive estimating angular position of spindle motor during spin-up by computing differences in winding current rise times.

2. Description of the Prior Art

Figure 1:
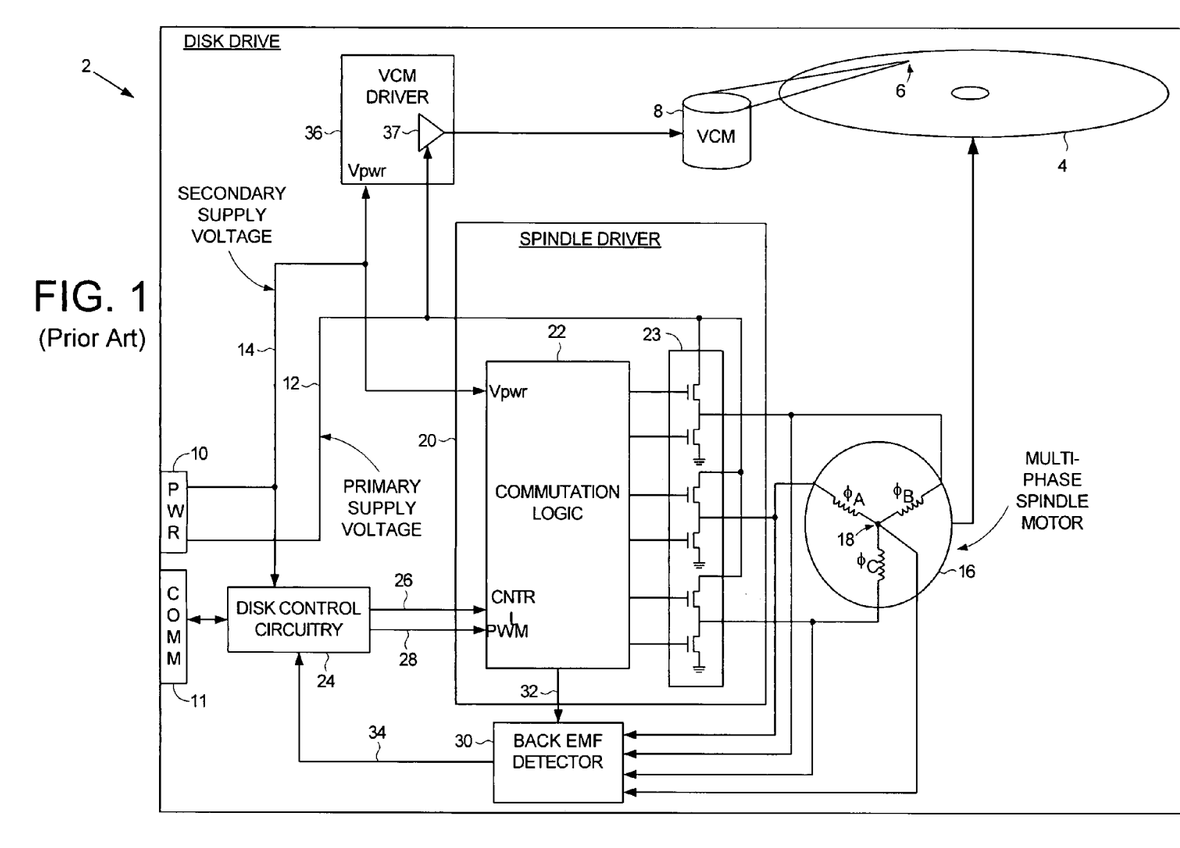
FIG. 1 is a block diagram of a prior art disk drive comprising a spindle motor and commutation logic for commutating the spindle motor in response to a back EMF voltage generated by the spindle motor.

FIG. 1 shows a prior art disk drive 2 comprising a disk 4 having a plurality of tracks, a head 6, a voice coil motor 8 for actuating the head 6 radially over the disk 4, and an interface 10 for receiving a primary supply voltage 12 and a secondary supply voltage 14 from a host computer. The disk drive 2 further comprises a multi-phase spindle motor 16 for rotating the disk 4, the multi-phase spindle motor 16 comprising a plurality of windings (e.g., $\phi A$, $\phi B$, $\phi C$), each winding comprising a first end and a second end, the second ends connected together at a center tap 18. A spindle driver 20, responsive to the primary supply voltage 12, commutates the windings over commutation intervals. The spindle motor 16 is shown as comprising three windings ($\phi A$, $\phi B$, $\phi C$) corresponding to three phases. However, any suitable number of windings may be employed to implement any suitable multi-phase spindle motor. Further, any suitable commutation sequence may be employed to commutate the windings. For example, the commutation logic 22 may control switches 23 to commutate the windings of the spindle motor 16 in a two-phase, three-phase, or hybrid two-phase/three-phase commutation sequence.

Disk control circuitry 24 communicates with the host computer over interface 11 and executes various operations (e.g., servo control, read/write channel, etc.) to perform read and write commands. The disk control circuitry 24 generates a control signal 26 and a pulse width modulated (PWM) signal 28 applied to the spindle driver 22. The control signal 26 comprises control information (such as a starting state and a commutation clock), and the PWM signal 28 is used to modulate the driving current in the windings. The windings are connected to a back EMF detector 30 which detects threshold crossings (e.g., zero crossings) in the back EMF voltage generated by the windings with respect to the center tap 18. Since the back EMF voltage is distorted when current is flowing, the spindle driver 20 supplies a control signal 32 to the back EMF detector 30 identifying the "open" winding generating a valid back EMF signal. At each back EMF threshold crossing the back EMF detector 30 toggles a signal to generate a square wave signal 34. The frequency of the back EMF threshold crossings and thus the frequency of the square wave signal 34 represent the speed of the spindle motor 16. The disk control circuitry 24 evaluates the square wave signal 34 and adjusts the PWM signal 28 in order to control the speed of the spindle motor 16.

The disk drive 2 of FIG. 1 further comprises a voice coil motor (VCM) driver 36 responsive to the primary and secondary supply voltages 12 and 14. The VCM driver 36 applies the primary supply voltage 12 to the voice coil motor 8 through driver 37 either in a linear power amplifier mode or in a modulated sequence (e.g., PWM) to control the speed of the voice coil motor 8 while actuating the head 6 radially over the disk 4. The secondary supply voltage 14 powers circuitry within the VCM driver 36 as well as other circuitry within the disk drive 2, such as the spindle driver 20 and disk control circuitry 24. In one embodiment, the primary supply voltage 12 comprises twelve volts and the secondary supply voltage 14 comprises five volts. In an alternative embodiment, the disk drive 2 receives a single supply voltage (e.g., five volts) for driving the VCM 8 and spindle motor 16 and for powering circuitry in the disk drive 2.

When the disk drive 2 is powered on, the disk control circuitry 24 performs a "spin-up" operation to spin the spindle motor 16 up to speed. At low speeds the back EMF voltages generated by the spindle motor 16 do not provide a reliable estimate of velocity. Therefore, the disk control circuitry 24 typically estimates the velocity of the spindle motor 16 during the spin up operation by evaluating the rise times in the winding currents to estimate the angular position of the spindle motor 16 (and taking the derivative to estimate velocity). Once the velocity of the spindle motor 16 exceeds a predetermined threshold, the disk control circuitry 24 switches to the back EMF voltages for estimating the velocity and control the speed of the spindle motor 16 in a closed loop servo system.

It is known to evaluate the winding current rise times to estimate the velocity of the spindle motor 16 during spin-up. For example, U.S. Pat. No. 5,530,326 discloses a technique wherein the primary voltage 12 is applied to each phase of the spindle motor 16 and the corresponding current rise time is measured. Since the inductance of each phase varies depending on the angular position of the rotor with respect to the stator, the relative durations in the winding current rise times for each phase provides a rough estimate of the angular position of the rotor. This rough estimate of angular position can be used to clock the commutation sequence as well as estimate the velocity for switching to back EMF feedback control. For example, the phase which generates the shortest rise time may be energized first since it is considered to be aligned closest with the magnetic fields emanating from the rotor magnets. However, estimating the angular position by finding the shortest winding current rise time provides only a "quadrant" position with a $\pm 30$ electrical degree of uncertainty. This uncertainty leads to errors in clocking the commutation sequence and increases the target exit velocity for switching to back EMF control, thereby increasing the overall spin-up time.

U.S. Pat. No. 6,100,656 discloses an inductive sense technique for measuring a more exact angular position of the spindle motor during spin-up by computing sinusoidal components of forward current and reverse current rise times in each phase of the spindle motor. However, measuring the rise time for both a forward current and a reverse current increases the delay required to estimate the angular position of the spindle motor, which degrades performance of the spin-up operation particularly if implemented using a closed loop servo system.

There is, therefore, a need for a simple, relatively fast technique for measuring the angular position of a spindle motor to facilitate a spin-up operation in a disk drive.

SUMMARY OF THE INVENTION

The present invention may be regarded as a disk drive comprising a disk, a head actuated over the disk, a spindle motor for rotating the disk, the spindle motor comprising a plurality of windings including at least a first winding a second winding, and a third winding. The disk drive further comprises disk control circuitry for executing a spin-up operation of the spindle motor. A voltage is applied to the first winding and a first rise time is measured for current flowing through the first winding to reach a predetermined threshold. A voltage is applied to the second winding and a second rise time is measured for current flowing through the second winding to reach a predetermined threshold. A voltage is applied to the third winding and a third rise time is measured for current flowing through the third winding to reach a predetermined threshold. A difference is computed in response to the first rise time, the second rise time, and the third rise time, and an angular position of the spindle motor is estimated by computing an arctangent in response to the difference.

In one embodiment, the first rise time, the second rise time, and the third rise time are evaluated to determine a quadrant for the estimated angular position.

In another embodiment, the spindle motor comprises a first coil, a second coil, and a third coil connected together at a center tap. The first coil represents the first winding, the second coil represents the second winding, and the third coil represents the third winding.

In yet another embodiment, the spindle motor comprises at least three coils that are commutated according to commutation states of a commutation sequence. In one embodiment, the first winding comprises two of the coils connected in series according to a first commutation state, the second winding comprises two of the coils connected in series according to a second commutation state, and the third winding comprises two of the coils connected in series according to a third commutation state.

In still another embodiment, three rise times are measured $t_A$, $t_B$, and $t_C$ corresponding to three windings in the spindle motor. Differences between the rise times are computed $$\Delta t_1 = t_A - t_C; \Delta t_2 = t_A - t_B; \text{ and } \Delta t_3 = t_B - t_C,$$

as well as:

$$\arctan((\Delta t_2 - \Delta t_1 - 2\Delta t_3)/(1.732(\Delta t_1 + \Delta t_2))).$$

In yet another embodiment, the spindle motor is controlled in a closed loop servo system using the estimated angular position as feedback. In one embodiment, the spindle motor is commutated in response to the estimated angular position. In another embodiment, the angular position of the spindle motor is estimated at a predetermined interval and the angular velocity of the spindle motor is estimated in response to a plurality of the estimated angular positions and the predetermined interval. In still another embodiment, the estimated angular velocity of the spindle motor is compared to a predetermined threshold. If the estimated angular velocity exceeds the predetermined threshold, the spindle motor is controlled in a closed loop system using a back EMF voltage generated by the spindle motor.

The present invention may also be regarded as a method of spinning up a disk in a disk drive, the disk drive comprising a head actuated over the disk, and a spindle motor for spinning the disk. The spindle motor comprises a plurality of windings including at least a first winding, a second winding, and a third winding. A voltage is applied to the first winding and a first rise time is measured for current flowing through the first winding to reach a predetermined threshold. A voltage is applied to the second winding and a second rise time is measured for current flowing through the second winding to reach a predetermined threshold. A voltage is applied to the third winding and a third rise time is measured for current flowing through the third winding to reach a predetermined threshold. A difference is computed in response to the first rise time, the second rise time, and the third rise time, and an angular position of the spindle motor is estimated by computing an arctangent in response to the difference.

DESCRIPTION OF THE PREFERRED EMBODIMENTS

Figures 2A, 2B:
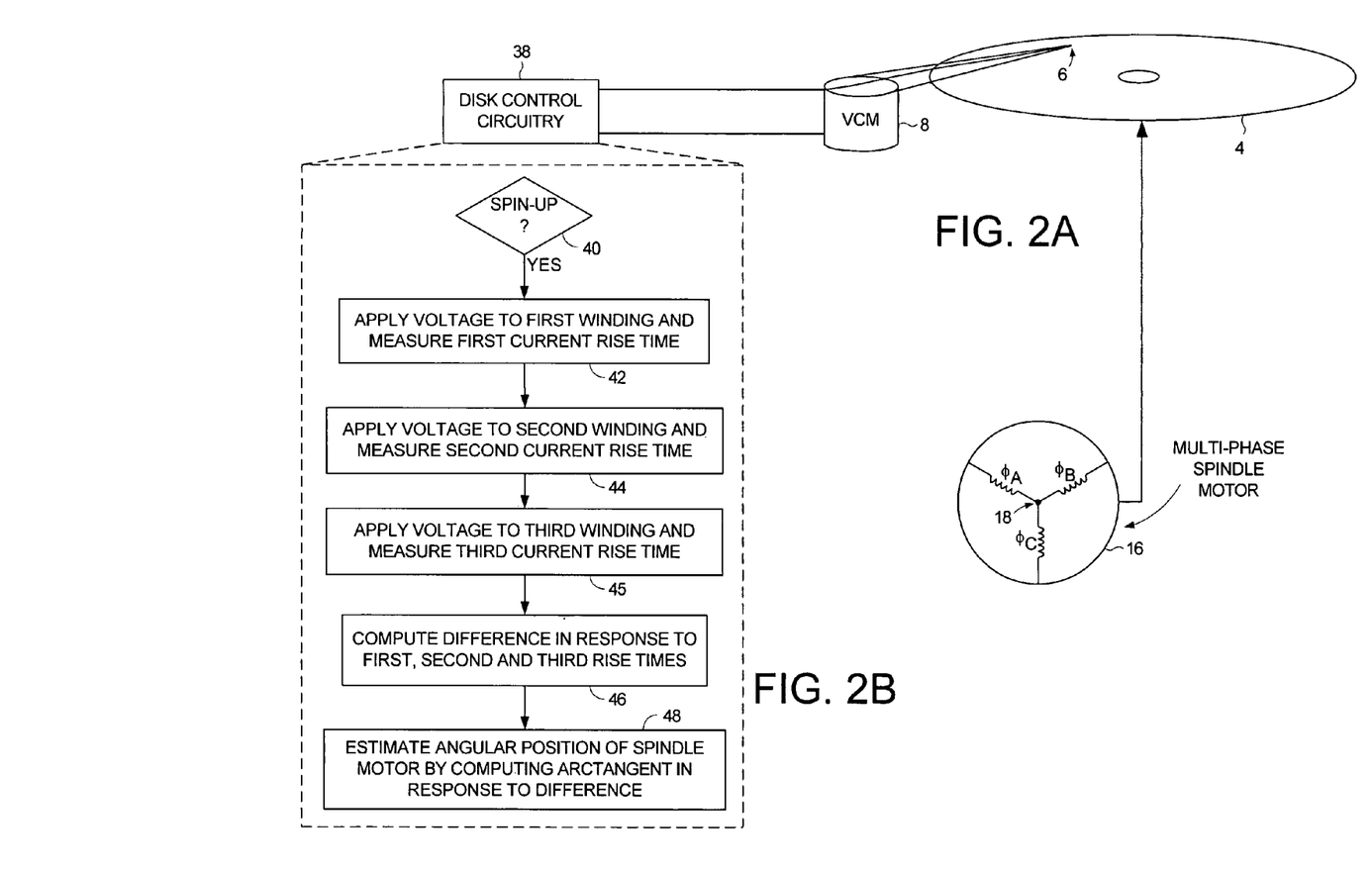
FIG. 2A shows a disk drive according to an embodiment of the present invention comprising disk control circuitry for executing a spin-up operation of the spindle motor.
FIG. 2B is a flow diagram of the steps executed by the disk controller to perform the spin-up operation, including to measure at least a first and second rise time of current in first and second windings, computing a difference between the rise times, and computing an arctangent in response to the difference.

FIG. 2A shows a disk drive according to an embodiment of the present invention comprising a disk 4, a head 6 actuated over the disk 4, a spindle motor 16 for rotating the disk 4. The spindle motor 16 comprising a plurality of windings including at least a first winding, a second winding, and a third winding (in the embodiment of FIG. 2A, the spindle motor 16 comprises three coils φA, φB, and φC one of which represents a winding or two connected in series represents a winding). The disk drive further comprises disk control circuitry 38 for executing a spin-up operation of the spindle motor 16 as shown in the flow diagram of FIG. 2B. If at step 40 a spin-up operation is initiated, at step 42 a voltage is applied to the first winding and a first rise time is measured for current flowing through the first winding to reach a predetermined threshold. At step 44 a voltage is applied to the second winding and a second rise time is measured for current flowing through the second winding to reach a predetermined threshold. At step 45 a voltage is applied to the third winding and a third rise time is measured for current flowing through the third winding to reach a predetermined threshold. At step 46 a difference is computed in response to the first rise time, the second rise time, and the third rise time, and at step 48 an angular position of the spindle motor is estimated by computing an arctangent in response to the difference.

Figure 3A:
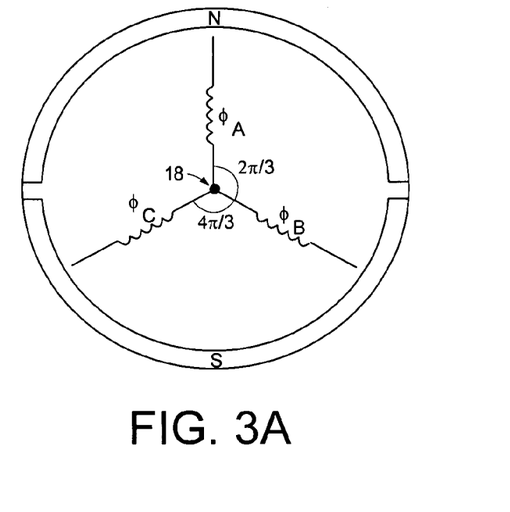
FIG. 3A illustrates a two pole, three phase spindle motor comprising an A coil a B coil and a C coil.

FIG. 3A shows an example spindle motor comprising three phases or coils ϕA, ϕB, and ϕC and two magnets or poles, although any suitable number of coils and poles may be employed. A typical spindle motor employed in a disk drive comprises three phases and eight poles. In the embodiments of the present invention, the angular position of the spindle motor is estimated in electrical degrees, and therefore the following derivations apply to any number of poles.

The inductance of each coil changes relative to its angular position with respect to the poles due to the magnetic fields emanating from the poles, and therefore when a voltage is applied to a coil the rise time of current flowing through the coil changes with angular position. Ignoring the coil resistance, the current flowing through a coil is expressed as:

$$I = \frac{1}{L+\Delta L}\int_0^t V\,dt = \frac{Vt}{L+\Delta L} \qquad (1)$$

where I is the current flowing through the coil, L is the original inductance of the coil, and $\Delta L$ is the change in inductance due to the magnetic fields of the poles. Eq. (1) can be expressed for each coil as:

$$I_{TH} = \frac{Vt_A}{L_A+\Delta L_A} = \frac{Vt_B}{L_B+\Delta L_B} = \frac{Vt_C}{L_C+\Delta L_C} \qquad (2)$$

where $I_{TH}$ is a predetermined threshold current.

Figure 3B:
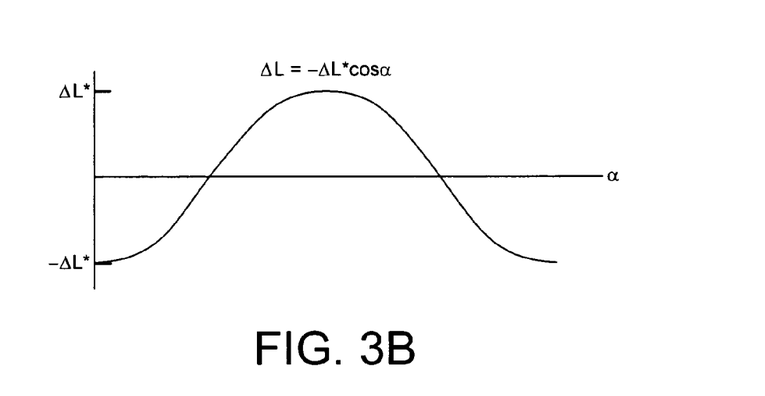
FIG. 3B is a waveform illustrating the changing inductance in a coil relative to the angular position of the coil.

FIG. 3B shows that the change in inductance can be represented as a cosine function:

$$\Delta L = -\Delta L^* \cos\alpha \qquad (3)$$

where $\Delta L^*$ is the maximum change in inductance for each coil (assuming equally matched coils) and the angle α is the angular displacement from the north pole (in FIG. 3A, α is zero for coil ϕA, $2\pi/3$ for coil ϕB, and $4\pi/3$ for coil ϕC). Rewriting Eq. (2) using Eq. (3) leads to:

$$I = \frac{Vt_A}{L-\Delta L^*\cos\alpha} = \frac{Vt_B}{L-\Delta L^*\cos\left(\alpha+\frac{2\pi}{3}\right)} = \frac{Vt_C}{L-\Delta L^*\cos\left(\alpha+\frac{4\pi}{3}\right)} \qquad (4)$$

From Eq. (4):

$$\frac{t_A}{\frac{L}{\Delta L^*}-\cos\alpha} = \frac{t_B}{\frac{L}{\Delta L^*}-\cos\left(\alpha+\frac{2\pi}{3}\right)} \qquad (5)$$

Eq. (5) transforms to:

$$\frac{L}{\Delta L^*}t_A - t_A\cos\left(\alpha+\frac{2\pi}{3}\right) = \frac{L}{\Delta L^*}t_B - t_B\cos\alpha \qquad (6)$$

Eq. (6) transforms to:

$$\frac{L}{\Delta L^*} = \frac{t_A\cos\left(\alpha+\frac{2\pi}{3}\right) - t_B\cos\alpha}{t_A - t_B} \qquad (7)$$

Also from Eq. (4):

$$\frac{t_A}{\frac{L}{\Delta L^*}-\cos\alpha} = \frac{t_C}{\frac{L}{\Delta L^*}-\cos\left(\alpha+\frac{4\pi}{3}\right)} \qquad (8)$$

Eq. (8) transforms to:

$$\frac{L}{\Delta L^*} = \frac{t_A\cos\left(\alpha+\frac{4\pi}{3}\right) - t_C\cos\alpha}{t_A - t_C} \qquad (9)$$

From Eq. (7) and (9):

$$\frac{t_A\cos\left(\alpha+\frac{2\pi}{3}\right) - t_B\cos\alpha}{t_A - t_B} = \frac{t_A\cos\left(\alpha+\frac{4\pi}{3}\right) - t_C\cos\alpha}{t_A - t_C} \qquad (10)$$

$$t_A(t_A-t_C)\cos\left(\alpha+\frac{2\pi}{3}\right) - t_B(t_A-t_C)\cos\alpha =$$
$$t_A(t_A-t_B)\cos\left(\alpha+\frac{4\pi}{3}\right) - t_C(t_A-t_B)\cos\alpha$$

$$t_A(t_A-t_C)\cos\left(\alpha+\frac{2\pi}{3}\right) - t_A(t_A-t_B)\cos\left(\alpha+\frac{4\pi}{3}\right) =$$
$$t_B(t_A-t_C)\cos\alpha - t_C(t_A-t_B)\cos\alpha$$

$$t_A(t_A-t_C)\cos\left(\alpha+\frac{2\pi}{3}\right) - t_A(t_A-t_B)\cos\left(\alpha+\frac{4\pi}{3}\right) =$$
$$(t_At_B - t_Bt_C - t_At_C + t_Bt_C)\cos\alpha = t_A(t_B-t_C)\cos\alpha$$

$$(t_A-t_C)\cos\left(\alpha+\frac{2\pi}{3}\right) - (t_A-t_B)\cos\left(\alpha+\frac{4\pi}{3}\right) = (t_B-t_C)\cos\alpha$$

Defining $\Delta t_1 = t_A - t_C$, $\Delta t_2 = t_A - t_B$ and $\Delta t_3 = t_B - t_C$, then Eq.(10) reduces to:

$$\Delta t_1\cos\left(\alpha+\frac{2\pi}{3}\right) - \Delta t_2\cos\left(\alpha+\frac{4\pi}{3}\right) = \Delta t_3\cos\alpha \qquad (11)$$

Expand the cosine and sine terms $$\Delta t_1\left(\cos\alpha\cos\frac{2\pi}{3} - \sin\alpha\sin\frac{2\pi}{3}\right) - \qquad (12)$$
$$\Delta t_2\left(\cos\alpha\cos\frac{4\pi}{3} - \sin\alpha\sin\frac{4\pi}{3}\right) = \Delta t_3\cos\alpha.$$

Substituting $\cos\frac{2\pi}{3} = \cos\frac{4\pi}{3} = -0.5$ and $\sin\frac{2\pi}{3} = -\sin\frac{4\pi}{3} = 0.866$ leads to:

-continued $$\Delta t_1 \cos\frac{2\pi}{3}\cos\alpha - \Delta t_1 \sin\frac{2\pi}{3}\sin\alpha -$$

$$\Delta t_2 \cos\frac{2\pi}{3}\cos\alpha - \Delta t_2 \sin\frac{2\pi}{3}\sin\alpha = \Delta t_3 \cos\alpha$$

$$\left(\Delta t_1 \cos\frac{2\pi}{3} - \Delta t_3 - \Delta t_2 \cos\frac{2\pi}{3}\right)\cos\alpha = (\Delta t_1 + \Delta t_2)\sin\frac{2\pi}{3}\sin\alpha$$

$$\tan\alpha = \frac{\Delta t_1 \cos\frac{2\pi}{3} - \Delta t_3 - \Delta t_2 \cos\frac{2\pi}{3}}{(\Delta t_1 + \Delta t_2)\sin\frac{2\pi}{3}} \text{ or}$$

$$\alpha = \arctan\frac{\Delta t_2 - \Delta t_1 - 2\Delta t_3}{1.732(\Delta t_1 + \Delta t_2)}$$

Figure 3C:
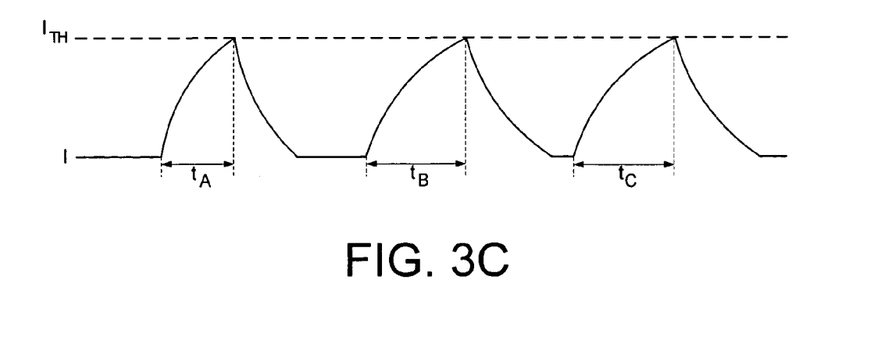
FIG. 3C illustrates the rise times of the current flowing through the three coils when a constant voltage is applied to each coil.

Therefore the angle α representing the angular displacement of the coil φA from the north pole (electrical degrees) can be determined by computing a difference between the current rise times in each coil $t_A$, $t_B$, $t_C$, and computing an arctangent in response to the difference. FIG. 3C illustrates the current rise times for each coil which is measured as the time it takes the current to reach a predetermined threshold TH after applying a voltage across each coil. A predetermined delay is required between each rise time measurement to allow the current in the previously measured coil to decay as shown in FIG. 3C.

Figure 4:
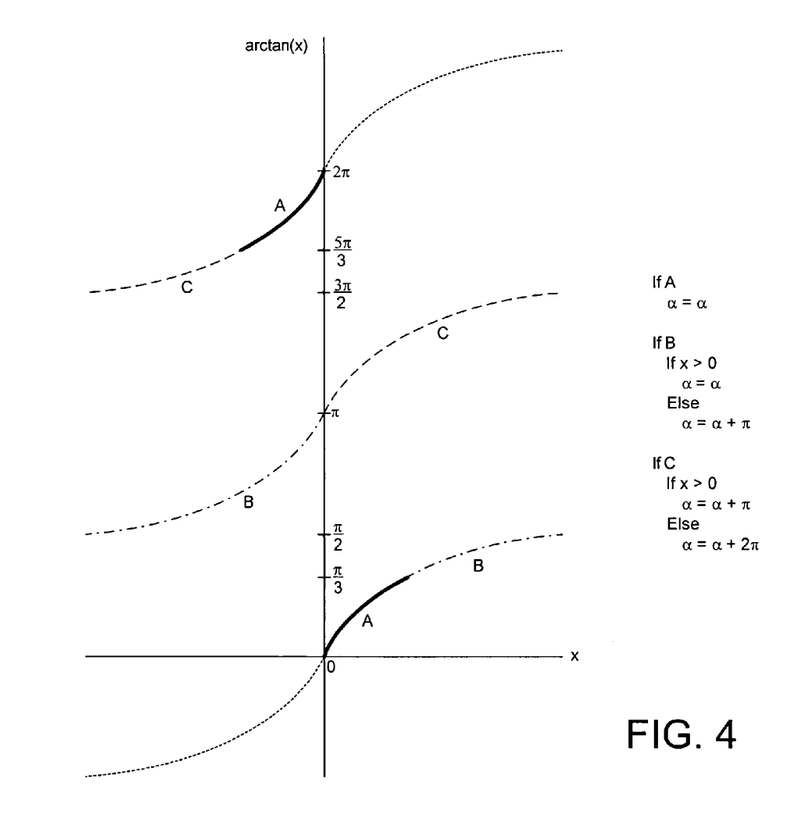
FIG. 4 illustrates how in one embodiment the ambiguity in the arctangent computation is resolved into a particular quadrant by comparing the current rise times for each of the three coils.

Since the arctangent function does not have a unique value over an entire electrical cycle (0-2π), in one embodiment the rise times for each coil are compared to determine a quadrant for the estimated angular position. The coil having the shortest rise time is the coil aligned closest to the north pole. Therefore, the quadrant for the estimated angular position can be determined from the shortest rise time as illustrated in FIG. 4. If $t_A$ is the shortest rise time, then α must be in the range 0 to π/3 and 5π/3 to 2π (equivalent to −π/3 to π/3) and no adjustment is made to α. If $t_B$ is the shortest rise time, then α must be in the range π/3 to π and therefore π is added to α if the argument of the arctangent is negative. If $t_C$ is the shortest rise time, then a must be in the range π to 5π/3 and therefore π is added to α if the argument of the arctangent is positive and 2π is added to α if the argument to the arctangent is negative.

Figure 5:
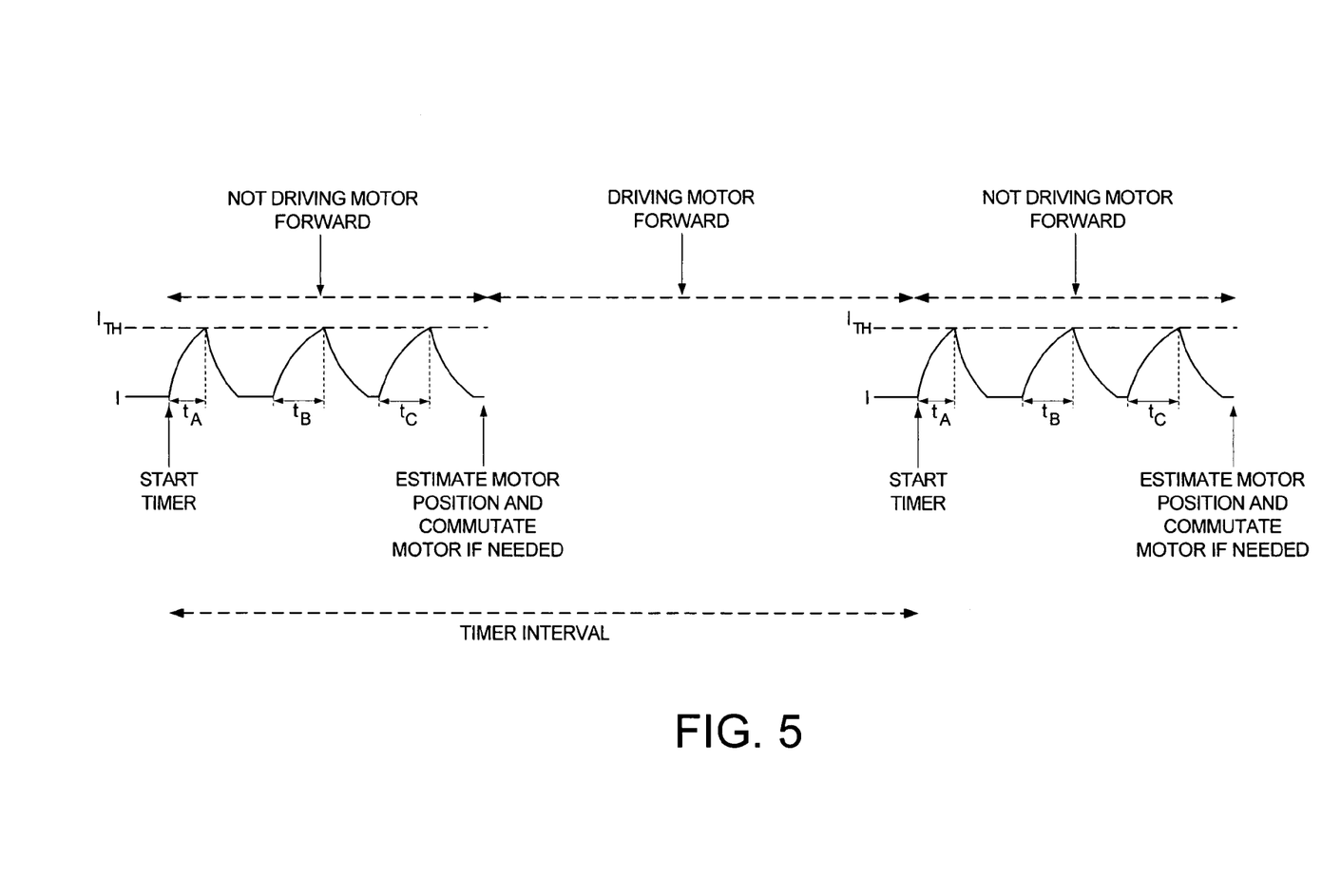
FIG. 5 illustrates an embodiment of the present invention wherein the angular velocity of the spindle motor is estimated by sensing the position of the coils at a predetermined interval.

In one embodiment, the disk control circuitry 38 implements a closed loop servo system for controlling the spindle motor 16 using the estimated angular position as feedback during the spin-up operation. When the spindle motor 16 reaches a predetermined angular velocity, the disk control circuitry 38 switches to using the back EMF signal 34 (FIG. 1) to control the velocity of the spindle motor 16. FIG. 5 illustrates an embodiment of the present invention wherein the angular velocity of the spindle motor 16 is estimated by sensing the position of the coils at a predetermined interval. The predetermined interval is measured by a timer, wherein the angular position of the spindle motor 16 is estimated when the timer expires. While the disk control circuitry 38 is measuring the rise times for each winding, the spindle motor 16 is not being driven forward. That is, the spindle motor 16 is driven forward only during the interval between each estimate of the angular position as shown in FIG. 5. After estimating the angular position, the spindle motor 16 is commutated to the next state if necessary (i.e., if the estimated angular position indicates the commutation state should be changed). The predetermined interval for estimating the angular position should be short enough so that there is sufficient resolution to commutate the spindle motor 16 at the appropriate time. Since the spindle motor 16 is driven only between the intervals for estimating the angular position, the present invention helps minimizes the time required to estimate the angular position by measuring the current rise time for each winding in only one direction (e.g., the forward direction) as compared to the prior art technique of measuring the rise time in the forward and reverse direction which essentially doubles the time to estimate the angular position.

Figure 6:
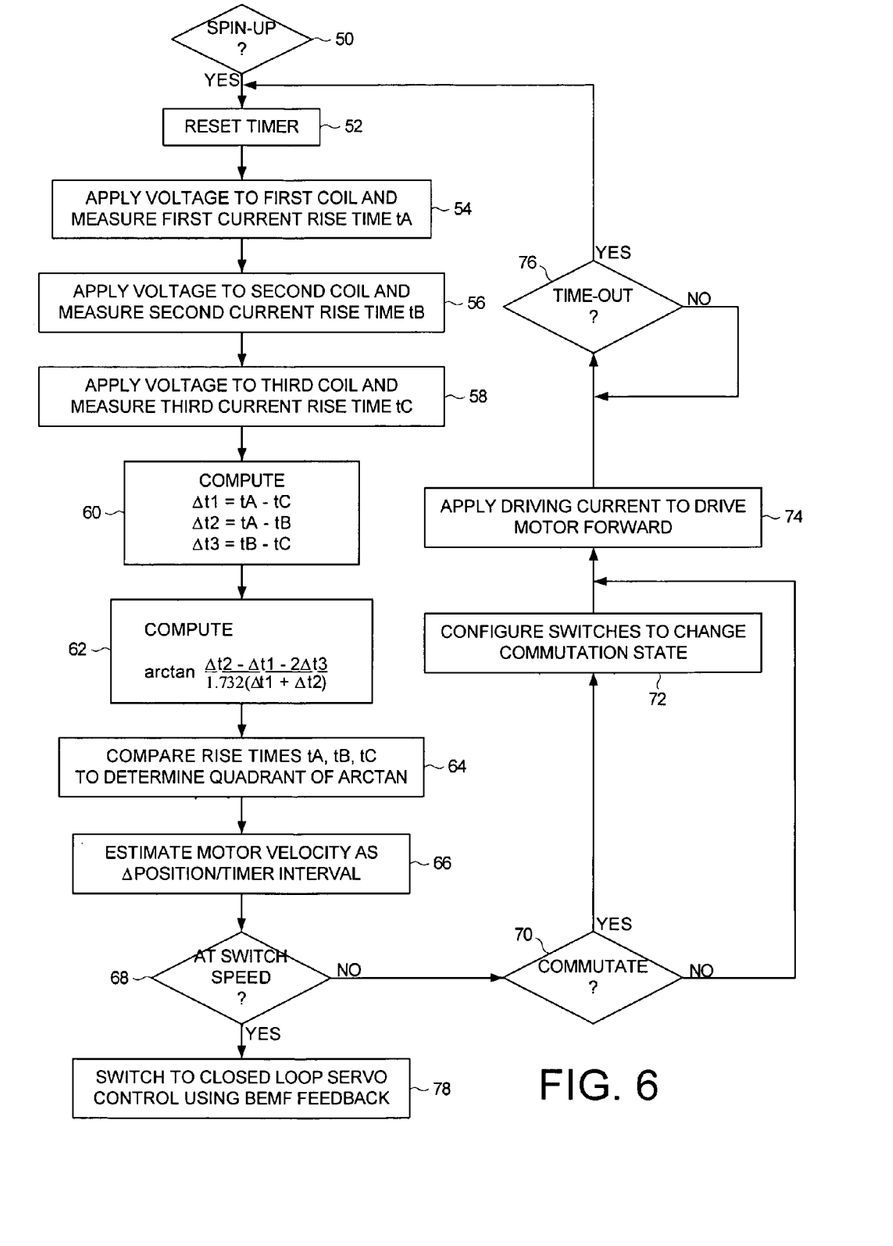
FIG. 6 is a flow diagram according to an embodiment of the present invention for estimating the angular position of a three phase spindle motor at a predetermined interval, and switching to back EMF servo control when the estimated velocity exceeds a predetermined threshold.

FIG. 6 is a flow diagram according to an embodiment of the present invention for estimating the angular position of a three phase spindle motor at a predetermined interval, and switching to back EMF servo control when the estimated velocity exceeds a predetermined threshold. If at step 50 a spin-up operation is initiated, at step 52 a timer is reset wherein the timer for timing the interval for estimating the angular position of the spindle motor 16. At step 54 a voltage is applied to the first coil φA and the rise time $t_A$ for the current to reach a predetermined threshold is measured. At step 56 a voltage is applied to the second coil φB and the rise time $t_B$ for the current to reach a predetermined threshold is measured. At step 58 a voltage is applied t0 the third coil φC and the rise time $t_C$ for the current to reach a predetermined threshold is measured. The rise times may be measured using any suitable technique, such as a current sensor in series with the coil. Any suitable voltage may be applied to the coils, and in one embodiment the primary supply voltage 12 (FIG. 1) is applied to each coil by appropriately configuring switches 23 and grounding the center tap 18.

Referring again to FIG. 6, at step 62 the disk control circuitry 38 computes $\Delta t_1 = t_A - t_C$, $\Delta t_2 = t_A - t_B$ and $\Delta t_3 = t_B - t_C$, and at step 64 computes the arctangent of Eq. 12 to estimate the angular position. At step 64 the disk control circuitry 38 compares the rise times $t_A$, $t_B$, $t_C$, to determine a quadrant for the estimated angular position as described above with reference to FIG. 4. At step 66 the disk control circuitry 38 estimates the spindle motor velocity by computing the difference between consecutive estimated angular positions divided by the time interval between estimates. If at step 68 the estimated velocity of the spindle motor 16 has not reached a "switch over" velocity, at step 70 the estimated angular position is evaluated to determine whether the spindle motor 16 should switch commutation states. If commutation is needed, at step 72 the switches 23 (FIG. 1) are configured to change the commutation state. At step 74 a driving current is applied to the spindle motor (e.g., by applying the primary supply voltage 12 to the windings pulse width modulated) to drive the spindle motor 16 forward. The disk control circuitry 38 then waits at step 76 until the timer expires wherein the flow diagram is repeated starting at step 52. If at step 68 the estimated velocity of the spindle motor 16 has reached the "switch over" velocity, then at step 78 the disk control circuitry 38 switches to controlling the velocity of the spindle motor using the back EMF voltage as feedback.

Figure 7:
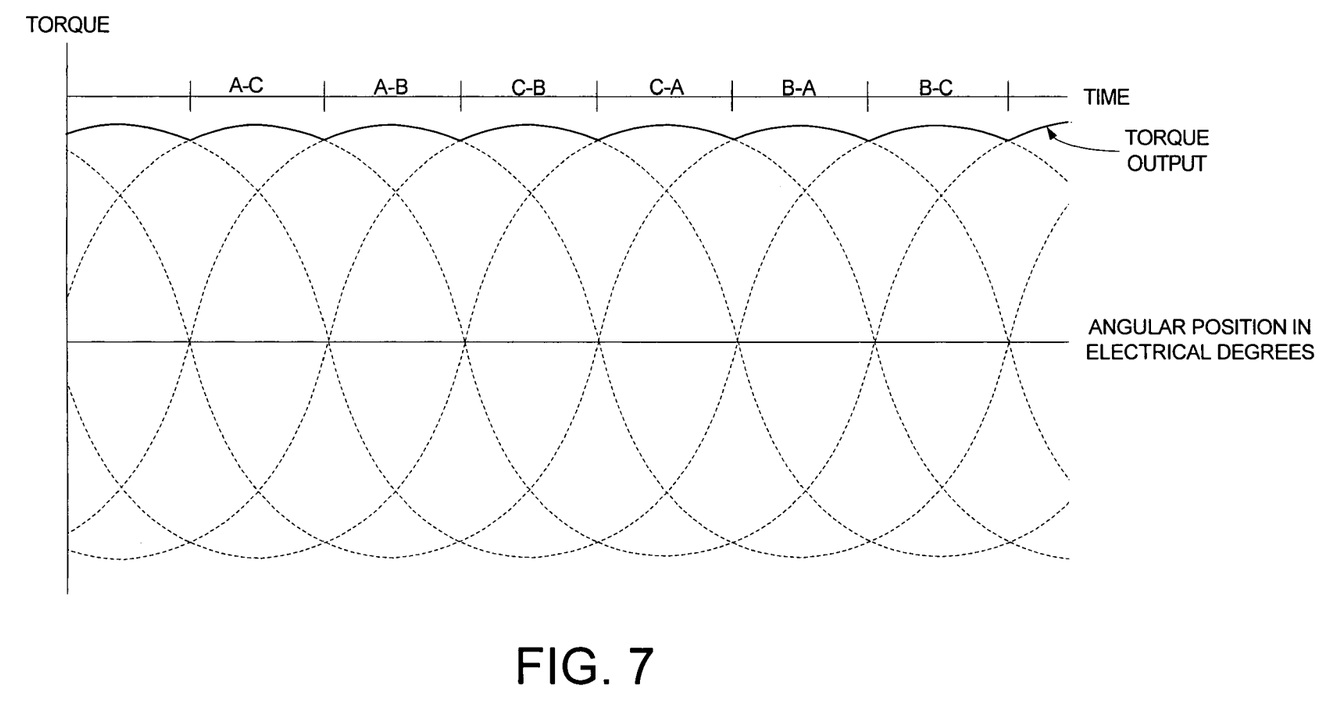
FIG. 7 shows the torque curves corresponding to six commutation states of an eight pole, three phase spindle motor.

The spindle motor 16 may be commutated using any suitable commutation technique. In one embodiment, the spindle motor 16 is commutated over six commutation states wherein during each commutation state two of the three coils are connected in series and energized by applying the primary voltage 12. FIG. 7 shows the torque curves (dashed lines) corresponding to the six commutation states A-C, A-B, C-B, C-A, B-A and B-C. If the commutation states are switched at the appropriate time relative to the angular position of the spindle motor 16, the torque applied to the spindle motor (solid line) is maximized. The embodiments of the present invention improve the accuracy of the estimated angular position, thereby improving the accuracy of commutation sequencing leading to increased torque output and decreased spin-up times.

Figure 8:
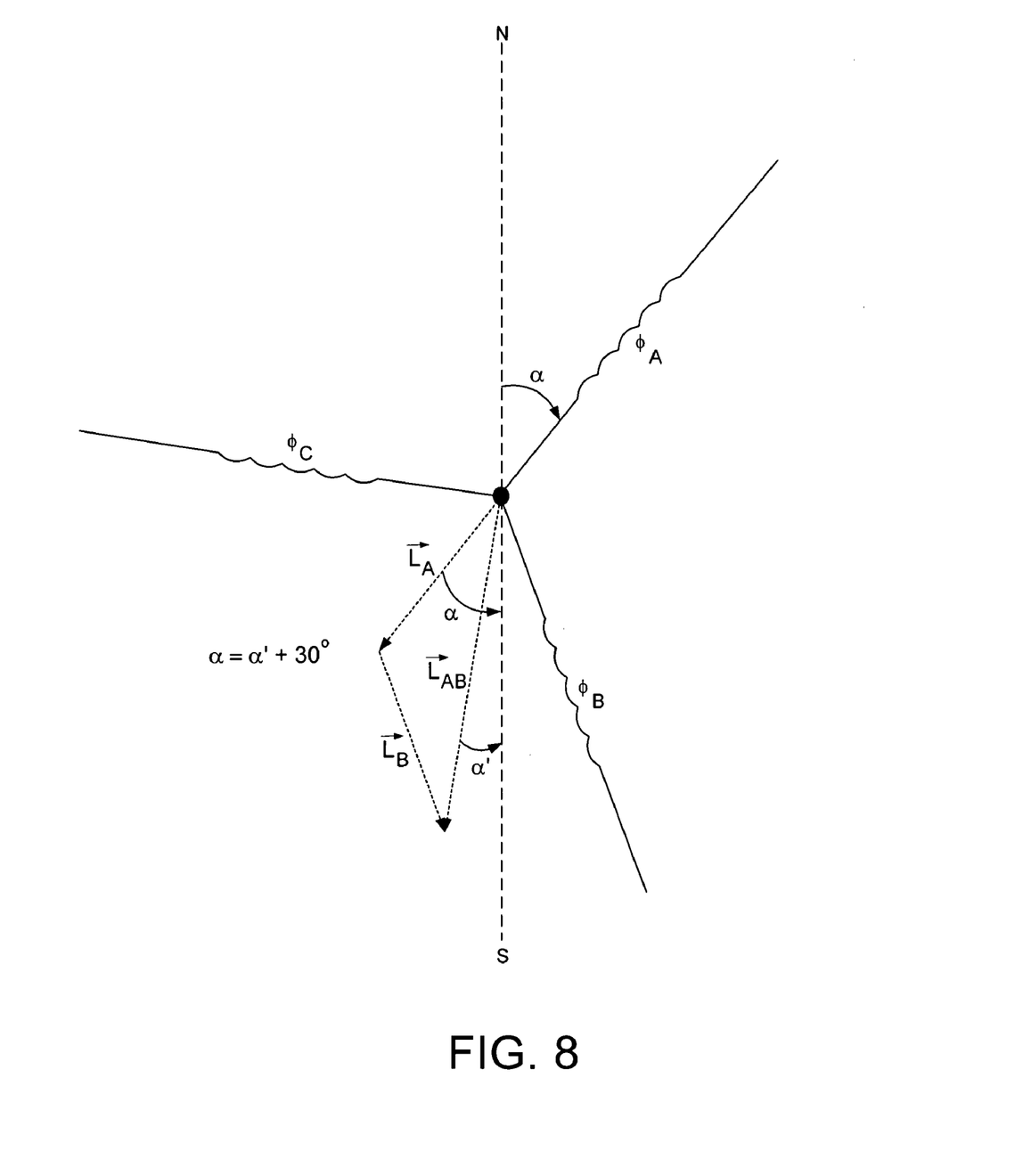
FIG. 8 illustrates an embodiment of the present invention for estimating the angular position of the spindle motor when the current rise time is measured through two coils connected in series according to a commutation state.

In another embodiment, the angular position of the spindle motor 16 is estimated by sensing the inductance of the coils (φA, φB, φC) connected in series according to three of the commutation states. For example, three rise times $t_{A-B}$, $t_{B-C}$ and $t_{C-A}$ are measured corresponding to the three commutation states A-B, B-C, and C-A. The difference in rise times are then computed as $\Delta t_1 = t_{A-B} - t_{C-A}$, $\Delta t_2 = t_{A-B} - t_{B-C}$ and $\Delta t_3 = t_{B-C} - t_{C-A}$, and the arctangent is computed according to Eq. 12 in response to the difference in rise times. FIG. 8 illustrates how the angular position α' computed from Eq. 12 for two coils φA-φB connected in series relates to the angular position α of the single coil φA. As shown in FIG. 8, the two coils connected in series φA-φB can be considered as a vector of inductance $\vec{L}_{AB}$. The angular position α' computed from Eq. 12 corresponds to the vector $\vec{L}_{AB}$, and the angular position α for the single coil φA is computed by adding 30° to α'.

The technique of the present invention for estimating the angular position of the spindle motor 16 can be extended to a spindle motor 16 comprising any suitable number of phases (coils). In addition, for spindle motors comprising more than three phases the angular position can be estimated by measuring the rise time for only three windings (three individual coils or coils connected in series according to a commutation state). For example, if the spindle motor 16 comprises four phases (four coils φA, φB, φC, φD), Eq. 4 changes to:

$$Im = \frac{Vt_A}{L - \Delta L^* \cos\alpha} = \frac{Vt_B}{L - \Delta L^* \cos(\alpha + \frac{\pi}{2})} = \frac{Vt_C}{L - \Delta L^* \cos(\alpha + \frac{3\pi}{2})} \quad (13)$$

Eq. 5 and Eq. 8 change to:

$$\frac{t_A}{\frac{L}{\Delta L^*} - \cos\alpha} = \frac{t_B}{\frac{L}{\Delta L^*} - \cos(\alpha + \frac{\pi}{2})}$$

$$\frac{t_A}{\frac{L}{\Delta L^*} - \cos\alpha} = \frac{t_C}{\frac{L}{\Delta L^*} - \cos(\alpha + \pi)}$$

After a derivation similar to the three phase spindle motor above:

Eq. 12 changes to:

$$\alpha = \arctan\frac{\Delta t_2 - \Delta t_3}{\Delta t_1} \quad (14)$$

Comparing Eq. 14 to Eq. 12 the number of computations is actually reduced for a four phase spindle motor. The angular position for two of the four coils connected in series according to a commutation state is estimated by considering the resulting inductance as a vector similar to the three phase embodiment disclosed above with reference to FIG. 8.

We claim:

1. A disk drive comprising:
   (a) a disk;
   (b) a head actuated over the disk;
   (c) a spindle motor for rotating the disk, the spindle motor comprising a plurality of windings including at least a first winding, a second winding, and a third winding;
   (d) disk control circuitry for executing a spin-up operation of the spindle motor by performing the steps of:
   applying a voltage to the first winding and measuring a first rise time for current flowing through the first winding to reach a predetermined threshold;
   applying a voltage to the second winding and measuring a second rise time for current flowing through the second winding to reach a predetermined threshold;
   applying a voltage to the third winding and measuring a third rise time for current flowing through the third winding to reach a predetermined threshold;
   computing a difference in response to the first rise time, the second rise time, and the third rise time; and
   estimating an angular position of the spindle motor by computing an arctangent in response to the difference.

2. The disk drive as recited in claim 1, wherein the disk control circuitry further performs the step of evaluating the first rise time, the second rise time, and the third rise time to determine a quadrant for the estimated angular position.

3. The disk drive as recited in claim 1, wherein:
   (a) the spindle motor comprises a first coil, a second coil, and a third coil connected together at a center tap; and
   (b) the first coil represents the first winding, the second coil represents the second winding, and the third coil represents the third winding.

4. The disk drive as recited in claim 1, wherein:
   (a) the spindle motor comprises at least three coils that are commutated according to commutation states of a commutation sequence;
   (b) the first winding comprises two of the coils connected in series according to a first commutation state;
   (c) the second winding comprises two of the coils connected in series according to a second commutation state; and
   (d) the third winding comprises two of the coils connected in series according to a third commutation state.

5. The disk drive as recited in claim 1, wherein:
   (a) the first rise time is represented as $t_A$, the second rise time is represented as $t_B$, and the third rise time is represented as $t_C$;
   (b) the step of computing a difference comprises the steps of computing:

$\Delta t_1 = t_A - t_C$ $\Delta t_2 = t_A - t_B$ $\Delta t_3 = t_B - t_C$ (c) the step of computing an arctangent comprises the step of computing:

arc tan(($\Delta t_2 - \Delta t_1 - 2\Delta t_3$)/(1.732($\Delta t_1 + \Delta t_2$))).

6. The disk drive as recited in claim 1, wherein the disk control circuitry implements a closed loop servo system for controlling the spindle motor using the estimated angular position as feedback.

7. The disk drive as recited in claim 6, wherein the disk control circuitry commutates the spindle motor in response to the estimated angular position.

8. The disk drive as recited in claim 7, wherein the disk control circuitry further performs the steps of:
   (a) estimating the angular position of the spindle motor at a predetermined interval; and
   (b) estimating an angular velocity of the spindle motor in response to a plurality of the estimated angular positions and the predetermined interval.

9. The disk drive as recited in claim 8, wherein the disk control circuitry further performs the steps of:
   (a) comparing the estimated angular velocity of the spindle motor to a predetermined threshold; and
   (b) if the estimated angular velocity exceeds the predetermined threshold, controlling the spindle motor in a closed loop system using a back EMF voltage generated by the spindle motor.

10. A method of spinning up a disk in a disk drive, the disk drive comprising a head actuated over the disk, and a spindle motor for spinning the disk, the spindle motor comprising a plurality of windings including at least a first winding, a second winding, and a third winding, the method comprising the steps of:
   (a) applying a voltage to the first winding and measuring a first rise time for current flowing through the first winding to reach a predetermined threshold;
   (b) applying a voltage to the second winding and measuring a second rise time for current flowing through the second winding to reach a predetermined threshold;
   (c) applying a voltage to the third winding and measuring a third rise time for current flowing through the third winding to reach a predetermined threshold;
   (d) computing a difference in response to the first rise time, the second rise time, and the third rise time; and
   (e) estimating an angular position of the spindle motor by computing an arctangent in response to the difference.

11. The method as recited in claim 10, further comprising the step of evaluating the first rise time, the second rise time, and the third rise time to determine a quadrant for the estimated angular position.

12. The method as recited in claim 10, wherein the spindle motor comprises a first coil representing the first winding, a second coil representing the second winding, and a third coil representing the third winding, the coils connected together at a center tap.

13. The method as recited in claim 10, wherein:
   (a) the spindle motor comprises at least three coils;
   (b) the coils are commutated according to commutation states of a commutation sequence;
   (c) the first winding comprises two of the coils connected in series according to a first commutation state;
   (d) the second winding comprises two of the coils connected in series according to a second commutation state; and
   (e) the third winding comprises two of the coils connected in series according to a third commutation state.

14. The method as recited in claim 10, wherein:
   (a) the first rise time is represented as $t_A$, the second rise time is represented as $t_B$, and the third rise time is represented as $t_C$;
   (b) the step of computing a difference comprises the steps of computing:

$$\Delta t_1 = t_A - t_C$$

$$\Delta t_2 = t_A - t_B$$

$$\Delta t_3 = t_B - t_C$$

(c) the step of computing an arctangent comprises the step of computing:

$$\arc\tan((\Delta t_2 - \Delta t_1 - 2\Delta t_3)/(1.732(\Delta t_1 + \Delta t_2))).$$

15. The method as recited in claim 10, further comprising the step of controlling the spindle motor in a closed loop servo system using the estimated angular position as feedback.

16. The method as recited in claim 15, further comprising the step of commutating the spindle motor in response to the estimated angular position.

17. The method as recited in claim 16, further comprising the steps of:
   (a) estimating the angular position of the spindle motor at a predetermined interval; and
   (b) estimating an angular velocity of the spindle motor in response to a plurality of the estimated angular positions and the predetermined interval.

18. The method as recited in claim 17, further comprising the steps of:
   (a) comparing the estimated angular velocity of the spindle motor to a predetermined threshold; and
   (b) if the estimated angular velocity exceeds the predetermined threshold, controlling the spindle motor in a closed loop system using a back EMF voltage generated by the spindle motor.

* * * * *